United States Patent [19]

Biotteau

[11] 4,337,292
[45] Jun. 29, 1982

[54] SHEET MATERIAL FOR USE AS PLAYING SURFACES AND METHOD FOR THE MANUFACTURE THEREOF

[75] Inventor: Gerard Biotteau, Saint-Pierre-Montlimart, France

[73] Assignee: Societe a Responsabilite Limitee Eram Industrie, Challones sur Loire, France

[21] Appl. No.: 86,045

[22] Filed: Oct. 18, 1979

[30] Foreign Application Priority Data

Oct. 18, 1978 [FR] France ............................. 78 29641

[51] Int. Cl.³ ........................... B32B 5/16; B32B 5/30
[52] U.S. Cl. ................................... 428/141; 427/180; 427/365; 427/366; 428/286; 428/327; 428/332
[58] Field of Search ................. 428/87, 141, 290, 147, 428/323, 17, 281, 286, 327, 282, 283, 284; 427/180, 365, 366; 264/299; 156/242; 106/36

[56] References Cited

U.S. PATENT DOCUMENTS

| 2,776,868 | 1/1957 | Russell et al. ................. 428/290 |
| 2,803,573 | 8/1957 | Hassel ............................ 428/282 |
| 3,801,421 | 4/1974 | Allen et al. ...................... 428/17 |
| 4,196,243 | 4/1980 | Sachs et al. ..................... 428/327 |

FOREIGN PATENT DOCUMENTS

| 812391 | 1/1974 | Belgium . |
| 868075 | 2/1978 | Belgium . |
| 2114435 | 10/1972 | Fed. Rep. of Germany . |
| 2406945 | 8/1975 | Fed. Rep. of Germany . |
| 2555089 | 6/1977 | Fed. Rep. of Germany . |
| 2623534 | 12/1977 | Fed. Rep. of Germany . |
| 2653991 | 6/1978 | Fed. Rep. of Germany . |
| 2654845 | 6/1978 | Fed. Rep. of Germany . |
| 2112087 | 6/1972 | France . |
| 1439139 | 6/1976 | United Kingdom . |

*Primary Examiner*—Paul J. Thibodeau
*Attorney, Agent, or Firm*—Young & Thompson

[57] ABSTRACT

Sheet material for surfaces for playing sports, comprises a support of non-woven fabric of polyester fibers having a thickness less than 1 mm., a polyurethane-base binder layer on the fabric, a layer of polyurethane powder at least partially embedded in the binder, and a finishing layer which is a polymerizable polyurethane resin whose exposed surface is the playing surface.

4 Claims, 1 Drawing Figure

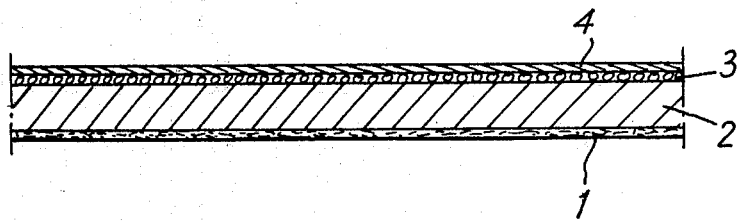

SHEET MATERIAL FOR USE AS PLAYING SURFACES AND METHOD FOR THE MANUFACTURE THEREOF

The present invention relates to sheet material for use on playing surfaces, and methods for the manufacture thereof.

It has already been proposed to provide artificial surfaces particularly for the practice of sports such as tennis courts, basketball courts and the like, athletic tracks, etc. by application of alternate layers of a polymerizable material and a powdered solid material which may be either a finely divided mineral substance, or an elastomer, rubber or resin, finely ground.

These surfaces generally have predetermined characteristics for such surfaces as to flexibility, anti-skid properties, durability and appearance. Their construction in situ from concrete or the like however presents difficulties as to the spreading, the dusting with fine powder, solidification and correct setting, solidification in situ is lengthy and operations at outdoor locations depend on favorable weather.

It has been proposed to manufacture such surface materials in the factory and to cement the produced sheets on a form. However, difficulties are encountered as a result of the lack of dimensional stability of the sheets. If, to remedy this, one or more layers of polymerizable material and finely divided powder are applied to a support having a certain thickness, the characteristics of the surface material are modified to an important degree, particularly as to flexibility. Moreover, the adhesion between the support and the layer of polymerizable material and between the support and the form, is of uncertain quality and the durability of the coating is less because of these two chances for coming unfastened.

The object of the present invention is to overcome these difficulties and to provide a sheet material for playing surfaces whose wearing surface is comprised of a layer of polymerizable resin and finely divided powder at least partially embedded in the polymerized resin, this wearing layer being applied to a support characterized in that the support is constituted by an unwoven fabric of thermoplastic fibers compatible with the polymerizable resin, calendared to a thickness less than 1 mm.

The thermoplastic fibers constituting the non-woven fabric should be compatible with the binder, thus to bond to the polymerizable resin during setting of the latter and also with the cement used to cement the material to the form. They should not be sensitive to the alkalinity of cement or to water. These are preferably polyester fibers. Other thermoplastic fibers may be used such as polyamide fibers, but in this case the cost of the non-woven fabric is considerably increased.

The present invention also provides a process for manufacturing sheet material for surfacing particularly for sports, thanks to which the new playing surfaces which may be thus prefabricated are in the form of sheets or rolls and may be emplaced directly on a prepared substrate of concrete, bituminous coating or the like, by simple cementing.

The method for making sheet material for playing surfaces in accordance with the present invention is characterized in that there is applied by casting with the help of a spinerette or nozzle to a non-woven fabric of thermoplastic fibers, calendared to a thickness less than 1 mm., a layer of polymerizable resin, spreading on the surface of the polymerizable resin while still in liquid phase a layer of a powdered solid material, and polymerizing the layer of polymerizable resin by passage through an oven at a temperature between 60° and 150° C.

The polymerizable resin is constituted in known manner by a polyurethane or polychloroprene binder. The powdered solid material is constituted by a polyurethane elastomer, vulcanized rubber, ethylenepropylene diamine monomer (EPDM), ethylene cyclopentadiene copolymer crosslinked or not, the fine powder being obtained by grinding the above materials in such a way as to obtain a granulometry between 0.5 and 5 mm., preferably 0.2 and 1 mm.

BRIEF DESCRIPTION OF THE DRAWINGS

The FIGURE shows a view of the sheet material of the invention.

The following are examples of the practice of the present invention.

EXAMPLE 1

According to the process of the present invention, the sheet material for sports surfaces is obtained by continuously applying by casting with the aid of nozzle spinerette on a support constituted by a non-woven fabric of polyester fibers of 150 g/m$^2$, calendared to a thickness of 0.2 mm., said support advancing at a speed of 1 m/min., a polymerizable resin in a polyurethane-base binder at a rate of 600 g/m$^2$.

The polyurethane-base binder employed is a compact two component system having the following weight composition:

| | |
|---|---|
| Polyoxypropylene glycerol | 100 |
| Fine chalk | 40 |
| Red iron oxide | 3 |
| Molecular sieve | 2 |
| Ethylene glycol | 3 |
| Tin salt | 0.2 |
| Diisocyanate prepolymer of diphenylmethane of 23% free NCO | 30. |

Ten seconds after the application of the binder layer, one spreads on said layer, a layer of powdered solid material constituted by a ground polyurethane elastomer or finely ground polyurethane having a granulometry of 0.2 to 1 mm., this layer being applied in an amount of 200 g/m$^2$.

To accelerate crosslinking, the composite is passed through a hot air drying oven at a temperature of 80° C. for five minutes. At the end of this, crosslinking of the elastomer is more than 80 percent complete. The flexible and rollable sheet material has a thickness of 2.5 to 3 mm. and a weight of 2550 g/m$^2$.

EXAMPLE 2

According to the present invention, there is employed the non-woven fabric of polyester fibers of Example 1, and there is deposited thereon in an amount of 1500 g/m$^2$, according to the procedure described above, a layer of a polyurethane-base binder having the following weight composition:

| | |
|---|---|
| Diisocyanate-base prepolymer of toluene with 2.5% NCO functions blocked with phenol | 100 |

| -continued | |
|---|---|
| Primary cycloaliphatic diamine | 6 |
| Fine chalk | 20 |
| Red iron oxide | 3 |
| Polyadipate plasticizer | 20 |
| Catalyst | 2. |

To this layer, there is continuously applied a layer of powdered polyurethane solid material, in an amount of 300 g/m².

One minute after laying down the layer of solid material, the composite is heated between 80° and 100° C. to trigger the crosslinking reaction, the reaction being complete about 5 minutes after the onset of heating. There can then be continuously applied a finishing layer constituted by a polyurethane resin in an amount of 200 g/m², which produces the sheet material shown in the drawing, the sheet material being constituted by a non-woven fabric 1 of polyester fibers of a thickness of 0.2 mm., a layer of polyurethane-base binder 2, a layer 3 of finely divided polyurethane, and a finishing layer 4 constituted by a polymerizable polyurethane resin.

The embodiments described above are susceptible of numerous modifications without departing from the annexed claims. In particular, the polyurethane-base powder may be replaced by polychloroprene powder, or powder of butadiene styrene rubber, ethylene propylene diene monomer, or ethylene cyclopentadiene copolymer, in the form of a powder.

I claim:

1. Sheet material for playing surfaces, comprising a layer of a non-woven fabric of polyester fibers calendered to a thickness of about 0.2 mm, a layer of polymerizable resin selected from the group consisting of polyurethane and polychloroprene binder compatible with the polyester fibers and disposed on the calendered layer of polyester fibers, and a layer of a finely divided elastomeric powder on the layer of polymerizable resin and at least partially embedded in the layer of polymerized resin.

2. Process for the production of sheet material for playing surfaces, comprising casting with the aid of a nozzle onto non-woven fabric of polyester fibers, calendared to a thickness of about 0.2 mm., a layer of polymerizable resin selected from the group consisting of polyurethane and polychloroprene binder, spreading on the surface of the polymerizable resin while still liquid, a layer of a powdered solid elastomeric material having a particle size between 0.2 and 5 mm., and passing the sheet material through a drying oven at a temperature between 60° and 150° C.

3. A process as claimed in claim 2, in which said particle size is 0.2 to 1 mm.

4. Sheet material obtained by a process as claimed in claim 3.

* * * * *